(12) United States Patent
Brown

(10) Patent No.: US 9,854,792 B1
(45) Date of Patent: Jan. 2, 2018

(54) DUGGER'S LIGHTNING STICKS SYSTEMS

(71) Applicant: Douglas W. Brown, Salem, IN (US)

(72) Inventor: Douglas W. Brown, Salem, IN (US)

( * ) Notice: Subject to any disclaimer, the term of this patent is extended or adjusted under 35 U.S.C. 154(b) by 131 days.

(21) Appl. No.: 14/459,344

(22) Filed: Aug. 14, 2014

Related U.S. Application Data

(60) Provisional application No. 61/867,562, filed on Aug. 19, 2013.

(51) Int. Cl.
*A01K 93/00* (2006.01)
*A01K 93/02* (2006.01)

(52) U.S. Cl.
CPC .............. *A01K 93/02* (2013.01); *A01K 93/00* (2013.01)

(58) Field of Classification Search
CPC ................................ A01K 93/00; A01K 93/02
USPC ......................... 43/4, 17.5, 44.87, 44.9, 44.91
See application file for complete search history.

(56) References Cited

U.S. PATENT DOCUMENTS

| | | | |
|---|---|---|---|
| 2,559,084 A | 7/1951 | Mcglade | |
| 3,056,229 A * | 10/1962 | Haney | A01K 93/00 43/44.87 |
| 4,010,567 A | 3/1977 | MacMillan | |
| 4,922,643 A | 5/1990 | Everett | |
| 5,190,366 A * | 3/1993 | World | F21K 2/00 362/234 |
| 5,199,205 A * | 4/1993 | Klammer | A01K 93/02 43/17 |
| 5,274,945 A * | 1/1994 | Ross | A01K 93/02 43/17.5 |
| 5,404,668 A * | 4/1995 | Christensen | A01K 93/00 43/44.87 |
| 5,675,927 A * | 10/1997 | Kloos | A01K 93/02 43/17.5 |
| 5,970,649 A * | 10/1999 | Alain | A01K 93/00 43/43.14 |
| 6,571,506 B1 * | 6/2003 | Hunsinger | A01K 93/02 43/17.5 |
| 7,100,323 B1 * | 9/2006 | Bogess | A01K 93/02 24/339 |
| 8,572,886 B2 * | 11/2013 | Bennis | A01K 93/00 43/17 |
| 2006/0213114 A1 * | 9/2006 | Kumlin | A01K 93/00 43/43.14 |
| 2006/0283074 A1 * | 12/2006 | Barrow | A01K 93/02 43/44.87 |

* cited by examiner

*Primary Examiner* — David Parsley
(74) *Attorney, Agent, or Firm* — RG Patent Consulting, LLC; Rachel Gilboy

(57) ABSTRACT

A product line of specialty fishing floats—floats designed specifically for overcast days and for night-fishing, and designed to work in conjunction with chemically luminescent "light sticks" to illuminate the strike-indicating float and help ensure that the angler will hook the striking fish.

14 Claims, 5 Drawing Sheets

DUGGER'S LIGHTNING STICKS SYSTEMS

CROSS-REFERENCE TO RELATED APPLICATION

The present application is related to and claims priority from prior provisional application Ser. No. 61/867,562, filed Aug. 19, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of floats for use in fishing and more specifically relates to luminescent fishing floats.

2. Description of the Related Art

Fishing is the activity of trying to catch fish. Fish are normally caught in the wild. Techniques for catching fish include hand gathering, spearing, netting, angling and trapping. In addition to providing food, modern fishing is also a recreational pastime. Recreational and sport fishing are fishing primarily for pleasure or competition. Recreational fishing has conventions, rules, licensing restrictions and laws that limit the way in which fish may be caught; typically, these prohibit the use of nets and the catching of fish with hooks not in the mouth. The most common form of recreational fishing is done with a rod, reel, line, hooks and any one of a wide range of baits or lures such as artificial flies. The practice of catching or attempting to catch fish with a hook is generally known as angling. In angling, it is sometimes expected or required that fish be returned to the water. Recreational or sport fishermen may log their catches or participate in fishing competitions. Low light conditions may make catching fish for fun or for food difficult; this is not desirable.

Various attempts have been made to solve the above-mentioned problems such as those found in U.S. Pat. No. 4,922,643 to Charles J. Everett; U.S. Pat. No. 2,559,084 to Hugh B. Mcglade; U.S. Pat. No. 4,010,567 to Russell James MacMillan. This art is representative of floats for use in fishing. None of the above inventions and patents, taken either singly or in combination, is seen to describe the invention as claimed.

Ideally, a luminescent fishing float system should provide floats designed specifically for overcast days and for night-fishing, and be designed to work in conjunction with chemically luminescent "light sticks" to illuminate the strike-indicating float and help ensure that the angler will hook the striking fish and, yet would operate reliably and be manufactured at a modest expense. Thus, a need exists for a reliable luminescent fishing float system to avoid the above-mentioned problems.

BRIEF SUMMARY OF THE INVENTION

In view of the foregoing disadvantages inherent in the known floats for fishing art, the present invention provides a novel luminescent fishing float system. The general purpose of the present invention, which will be described subsequently in greater detail is to provide a low-light fishing float means designed to enhance the fishing experience.

A luminescent fishing float system is disclosed herein comprising: a luminescent fishing float assembly having a cylindrical rod (with an inner through-hole running a length of the cylindrical rod, the inner through-hole defined by a first aperture and a second aperture), and a float body (having a top-aperture, and a bottom-aperture); wherein the luminescent fishing float system comprises the luminescent fishing float assembly. The luminescent fishing float assembly comprises in functional combination the cylindrical rod passing through the top-aperture and the bottom-aperture of the float body respectively.

The float body permits the luminescent fishing float assembly to maintain a floating position relative to a water surface. In preferred embodiments the cylindrical rod comprises flutes such that the cylindrical rod is deterred from spinning during use relative to the water. The float body preferably comprises plastic and bottom-weighting. The luminescent fishing float assembly is waterproof. The cylindrical rod is semi-transparent and may be found in a plurality of different colors such that the user-fisherman can choose what he/she believes to be attractive to the fish being sought. The cylindrical rod is preferably flexible such that the float body can be maintained in a substantially upright position even when bending as a fish is tugging on the line.

Referring now to the cylindrical rod; the cylindrical rod allows a fishing line to pass through the inner through-hole running the inner through-hole respectively through the first aperture and the second aperture, the fishing line attached to a baited hook (afterwards); wherein the cylindrical rod may be friction-fit in the top-aperture and the bottom-aperture of the float body. The luminescent fishing float assembly is able to provide luminescence during low-light conditions to increase efficiency and effectiveness in fishing episodes. As such, the luminescent fishing float assembly in combination with the baited hook serves to attract fish during the low-light conditions via chemical activation. The luminescent fishing float assembly is structured and arranged to suspend bait at a predetermined depth, to carry the baited hook to otherwise inaccessible areas of water by allowing the float body to drift in prevailing current, the float body serving as an illuminated bite indicator for a user-fisherman. The illuminated bite indicator is non-battery powered and creates only a negligible amount of heat during use. The present invention is environmentally-friendly.

A kit is also described including: a plurality of the cylindrical rods, a plurality of the float bodies, and a set of user-instructions.

A method of using a luminescent fishing float system is also disclosed herein comprising the steps of: inserting a cylindrical rod through a float body, both of user-preference, passing a fishing line through the cylindrical rod, attaching a baited hook, and activating an illumination to aid in attracting fish during low-light conditions. The method may further comprise the step of exchanging another cylindrical rod through the float body for use to increase efficiency and effectiveness in fishing episodes. The fishing float may also be made to fish in two other forms. 1. The light stick itself may have a hole running through the center axis and line pass through. (slip float version); 2. The light stick may be used as a fixed type float. Line running through float using the light stick to set fishing depth (fixed float version.)

The present invention holds significant improvements and serves as a luminescent fishing float system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, luminescent fishing float system, constructed and operative according to the teachings of the present invention.

The various embodiments of the present invention will hereinafter be described in conjunction with the appended drawings, wherein like designations denote like elements.

DETAILED DESCRIPTION

Figure 1:
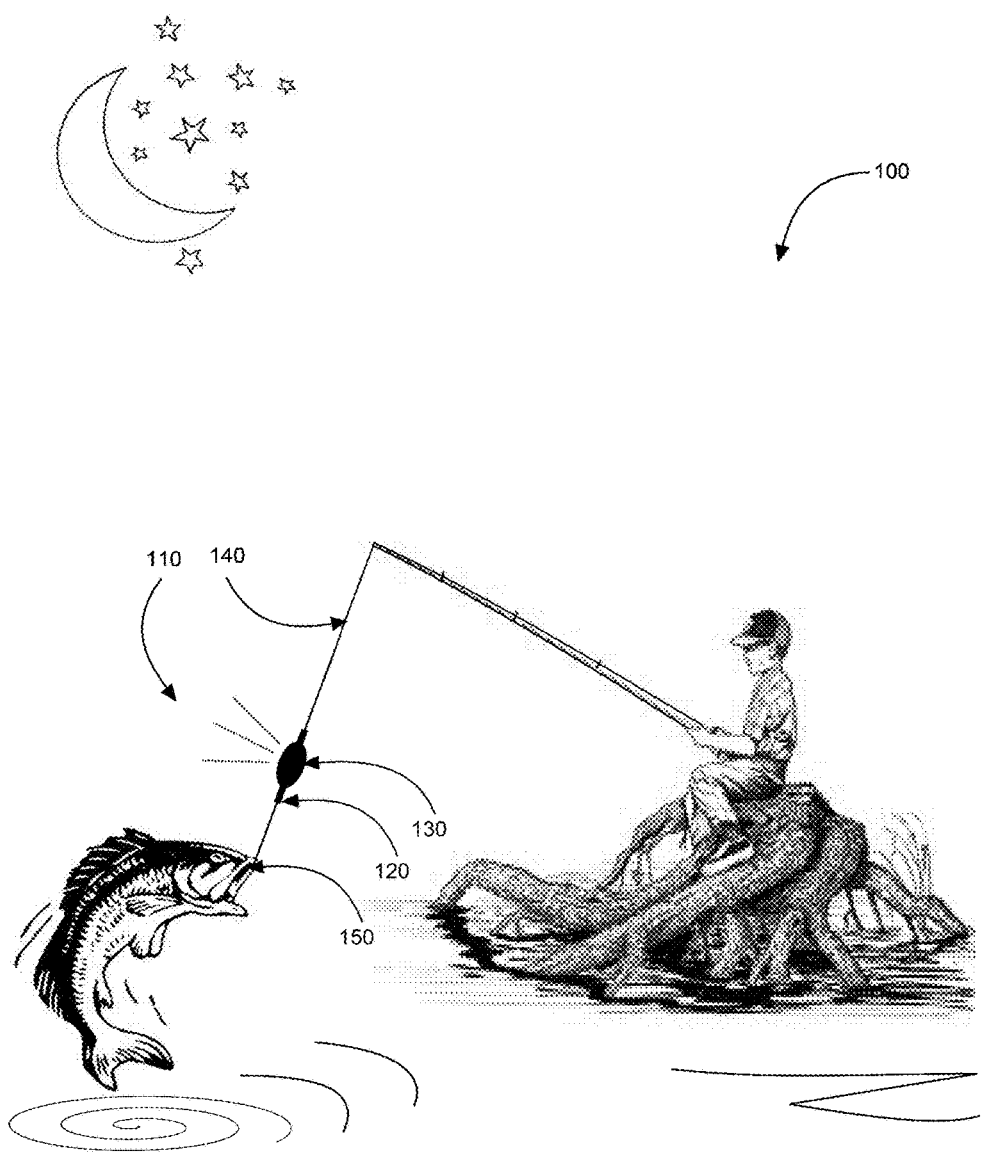
FIG. 1 shows a perspective view illustrating a luminescent fishing float system in an in-use condition according to an embodiment of the present invention.
Figure 2:
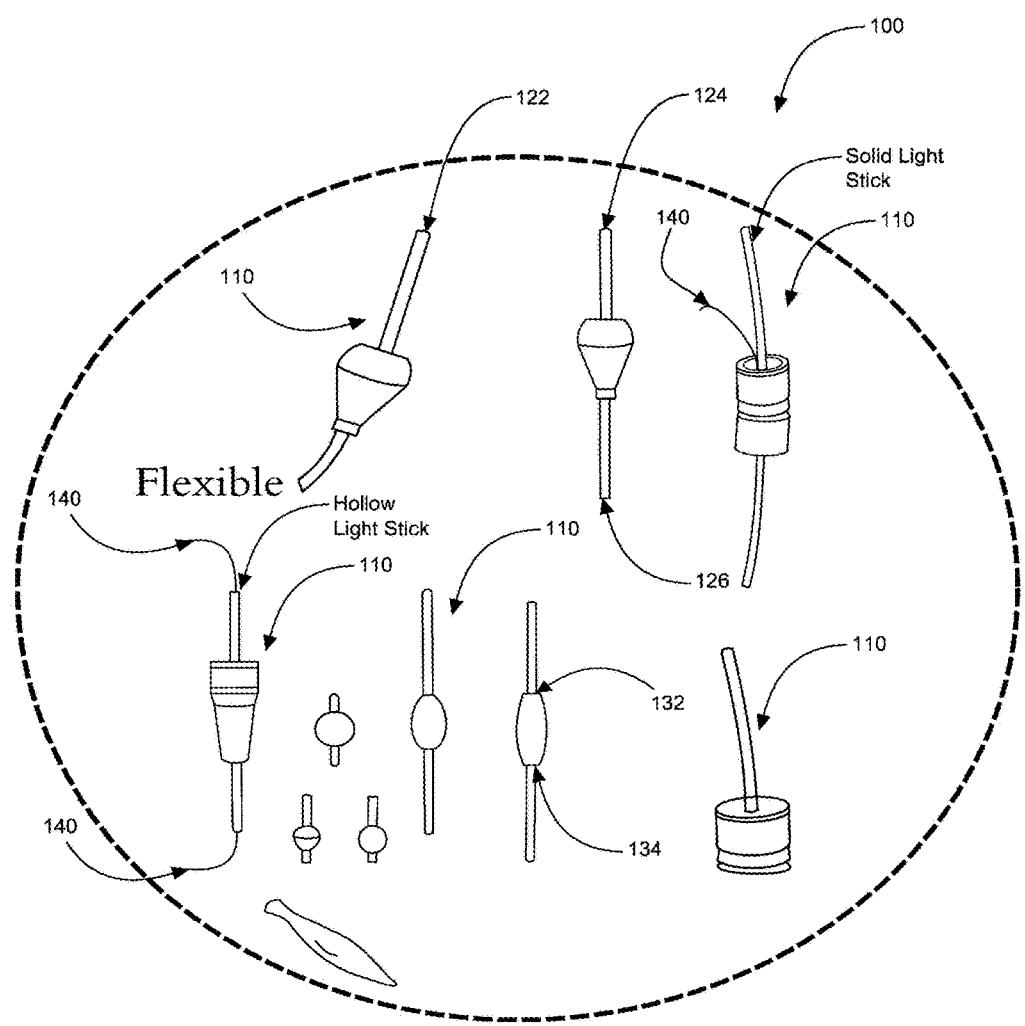
FIG. 2 is a perspective view illustrating a luminescent fishing float assembly of the luminescent fishing float system according to an embodiment of the present invention of FIG. 1.
Figure 3:
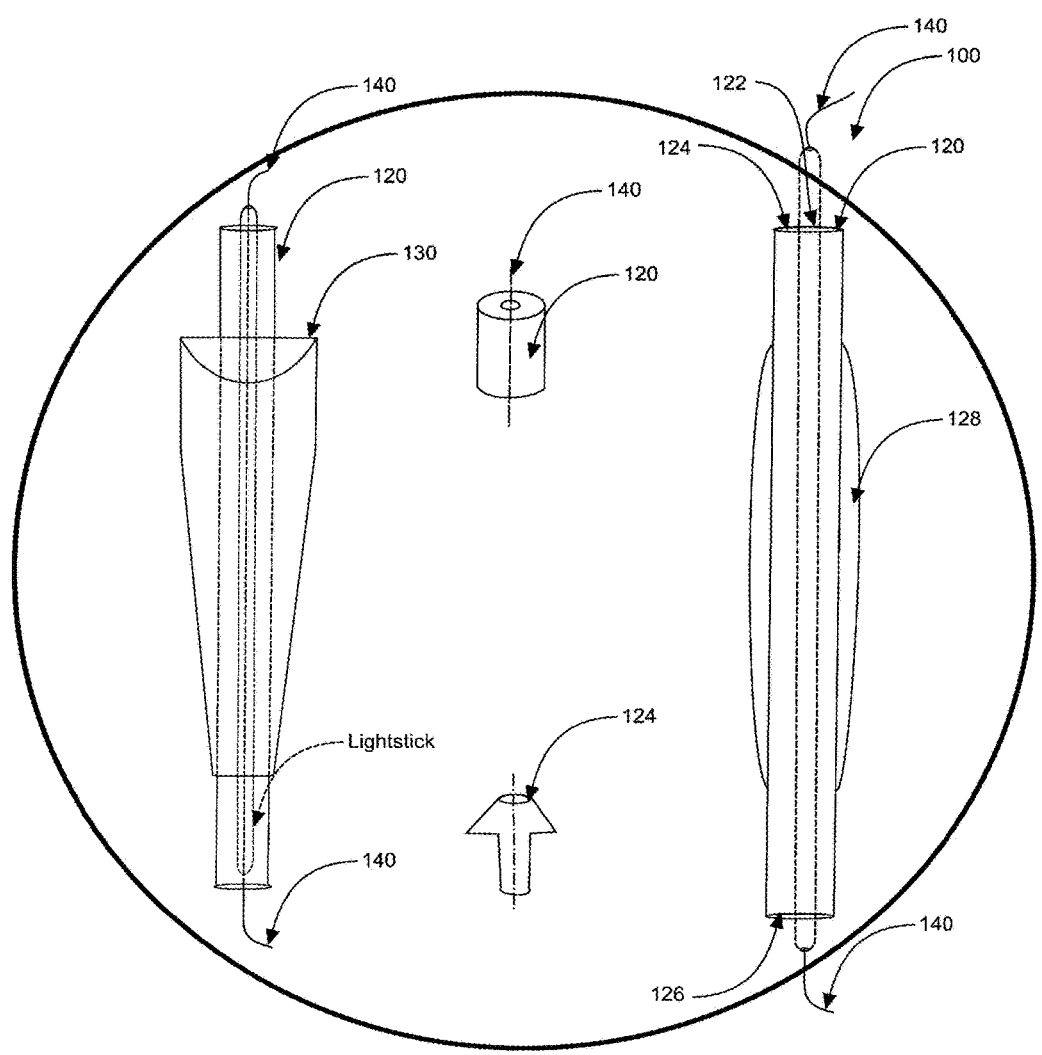
FIG. 3 is a perspective view illustrating another luminescent fishing float assembly according to an embodiment of the present invention of FIG. 1.

As discussed above, embodiments of the present invention relate to floats for use in fishing and more particularly to a luminescent fishing float system as used to improve the effectiveness and efficiency of low-light fishing.

Generally speaking, the 'Dugger's Lightning Sticks' comprises a "slip stick float," in which the fishing line runs through the hollow axis of a float (in various shapes and sizes), and the float is secured to the line by a rod or stick that is then pushed through the hollow axis of the float. The floats of the Dugger's Lightning Sticks line may be produced in materials ranging from STYROFOAM® to plastic, cork, wood, glass, rubber, "memory foam," and metal; other materials may be used such as composites. Likewise, the floats may be produced in standard shapes including oval, cigar, teardrop, spherical, egg, and pear. Other variations may include not only slip stick floats but peg floats, snap-on floats, spring-stick floats, and perhaps others as well. The floats may be solid, and may also feature a line-slit or slot for easier rigging.

In general terms, the floats may measure between ½ and 3 inches in diameter, with heights or lengths of 1 to 6 inches; although a range of larger sizes is certainly possible for big-game fish specialties. Further possibilities for the floats may include bottom-weighting; colors ranging from red and white to blue, red, orange, yellow, green, and transparent. The Dugger's floats might also be molded with 'surfacial' perforations or slits—the better to let the light through. The Dugger's floats are not simply fishing floats; they are also fishing lights.

Despite the great range of materials, sizes, and shapes that the Dugger's floats may take, the chief distinguishing feature of the Dugger's Lightning Sticks is not so much the floats themselves, as the sticks which secure the fishing line to the float. The Dugger's Lightning Sticks will fasten adjustably to the line with light sticks or glow sticks (chemically activated, luminescent rods). Glow sticks do not require an electrical power source, are waterproof, do not use batteries, generate negligible heat, are inexpensive, are easily disposable, and can tolerate high pressures, such as those found underwater. The various floats in the line may employ light sticks in a variety of lengths and diameters.

The lengths may generally fall between 2 and 11 inches, and the diameter will be determined by the diameter of the float's axial tube. In certain embodiments, an axial tube can be used with the float. Other than just the light stick itself being used, an axial tube may be also used to go through the float. It may be made of a variety of clear plastic tubing, or any other type of similar or like kind materials. The axial tube may use a hard rubber cap on each end, with a hole in the center of each cap. A hard plastic plug may be used also with a hole running through the centerline. Also one plug may be used on each end. The cap or plug I/D size is to be on scale with the line size being used.

The axial tube is inserted into the float. By taking the hard rubber cap or hard plastic plug off or out of one end of the tube and inserting an active light stick of appropriate size in relationship to axial tube, replace hard rubber cap or plastic plug back on or in axial tube. Next, the line is ran through the top of the cap, or through the plug, down through the axial tube and out through the bottom of the cap or plug. Now the user-fisherman has a slip float that can be set at any depth by the simple use of a bobber stop. The light stick works with the float. The axial tube works with the float and the light stick.

The light sticks may take the place of the wood or plastic rods conventionally used to fasten the fishing line to the float; and other configurations wherein the float fastens conventionally as a peg float or snap-on float, for example, yet also accommodates a light stick (also possible in this diversified and evolving product line). The light sticks of the Dugger's line may be produced in a variety of colors such as yellow, green, red, orange, blue, purple, and various "neon" hues; and the sticks may also be produced to glow for various periods of time. Optimally, each stick may remain illuminated for a whole night's fishing.

The great advantage of the Dugger's Lightning Sticks will be immediately apparent to every angler who has fished at night. Many species of fresh and saltwater fish, particularly in the warmer months of the year, are more active at night than in the day. The floats of the Dugger's Lightning Sticks product line enable the angler to see the float clearly in dim, overcast, foggy, rainy, or night conditions. This all-important novelty invention when used is the difference between a missed strike and a hooked fish.

Further, all anglers know that fish can be actually drawn to a light source: they are, to an extent that varies by species, a phototropic organism. (Knowing this, some anglers actually fish using light sticks as a lure.) The Dugger's Lightning Sticks, clever in conception, thoughtful in design, and proven effective in use, should find a wide and enthusiastic reception among the anglers, commercial and recreational, fresh and saltwater of America and the world. The Dugger's Lightning Sticks is cost-effective to produce.

Referring to the drawings by numerals of reference there is shown in FIGS. 1-4, various views of luminescent fishing float assemblies 110 of luminescent fishing float system 100. Luminescent fishing float system 100 comprises luminescent fishing float assembly 110 having cylindrical rod 120 (with inner through-hole 122 running a length of cylindrical rod 120; parameters of inner through-hole 122 defined by first aperture 124 and second aperture 126), float body 130 (having top-aperture 132, and bottom-aperture 134). Luminescent fishing float system 100 with illuminating means comprises luminescent fishing float assembly 110.

Luminescent fishing float assembly 110 comprises in functional combination cylindrical rod 120 passing through top-aperture 132 and bottom-aperture 134 of float body 130 respectively. Float body 130 permits luminescent fishing float assembly 110 to maintain a floating position relative to a water surface as shown in FIG. 1. Cylindrical rod 120 allows fishing line 140 to pass through inner through-hole 122 traveling respectively through first aperture 124 and second aperture 126; fishing line 140 attached to baited hook 150.

Luminescent fishing float assembly 110 is able to provide luminescence during low-light conditions to increase efficiency and effectiveness in fishing episodes. Luminescent fishing float assembly 110 is structured and arranged to suspend bait at a predetermined depth, to carry baited hook 150 to otherwise inaccessible areas of water by allowing float body 130 to drift in prevailing current; float body 130 serving as an illuminated bite indicator for a user-fisherman. Luminescent fishing float assembly 110 in combination with baited hook 150 serves to attract fish during the low-light conditions via chemical activation.

Referring more specifically to cylindrical rod 120; cylindrical rod 120 may comprise flutes 128 such that cylindrical rod 120 is effectively deterred from (excessive) spinning Float body 130 may comprise bottom-weighting; wherein float body 130 may comprise cork; wood; glass; or preferably plastic. Other materials may be used, as desired. Luminescent fishing float assembly 110 is preferably waterproof. Illuminated bite indicator (means), as such, is non-battery powered.

Cylindrical rod 120 is preferably semi-transparent such that illumination is enabled. Cylindrical rod 120 may be adjustable in certain embodiments to secure to fishing line 140. Cylindrical rod 120 may be friction-fit in top-aperture 132 and bottom-aperture 134 of float body 130. Cylindrical rod 120 is preferably flexible such that the orientation of luminescent fishing float assembly 110 when used is properly maintained. Luminescent fishing float assembly 110 may comprise a one-piece construction in certain embodiments or a multi-piece construction in alternate embodiments.

Figure 4:
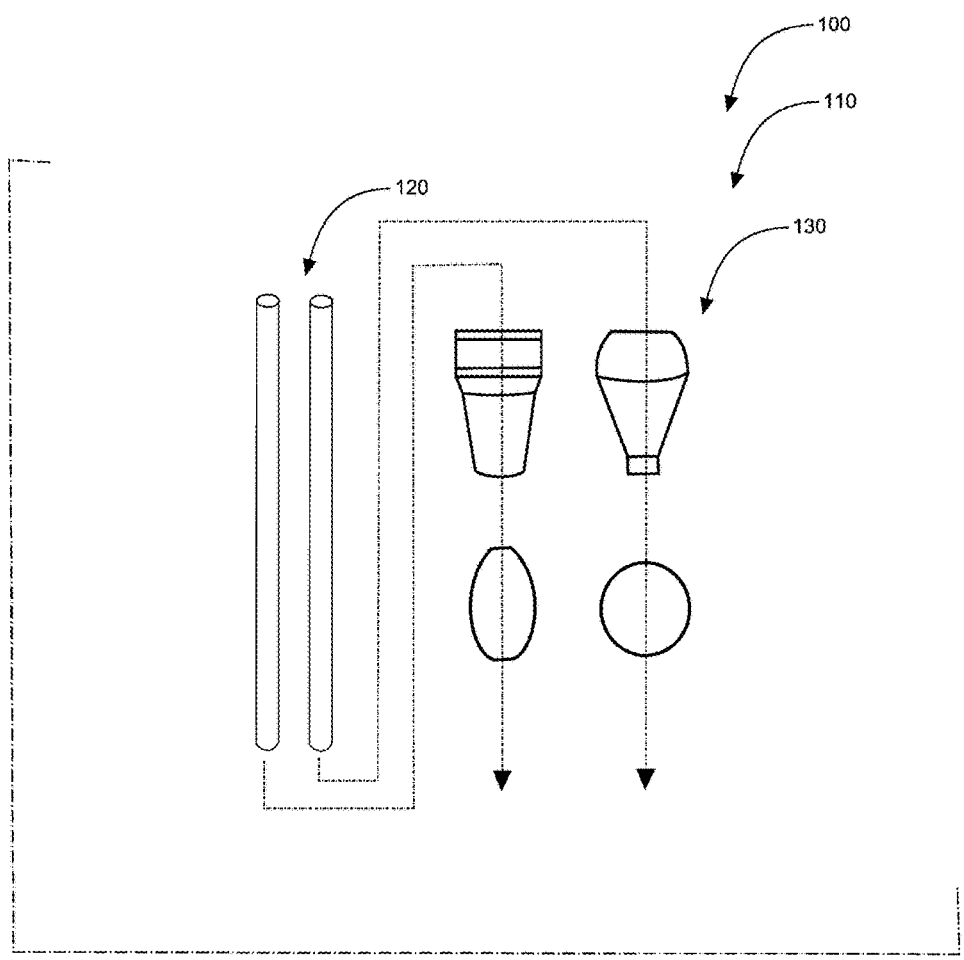
FIG. 4 is a perspective view illustrating a kit for the luminescent fishing float system according to an embodiment of the present invention of FIG. 1.

FIG. 4 shows luminescent fishing float system 100 which may be sold as kit comprising the following parts: a plurality of cylindrical rods 120; a plurality of float bodies 130; and at least one set of user instructions. The kit has instructions such that functional relationships are detailed in relation to the structure of the invention (such that the invention can be used, maintained, or the like in a preferred manner). Luminescent fishing float system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
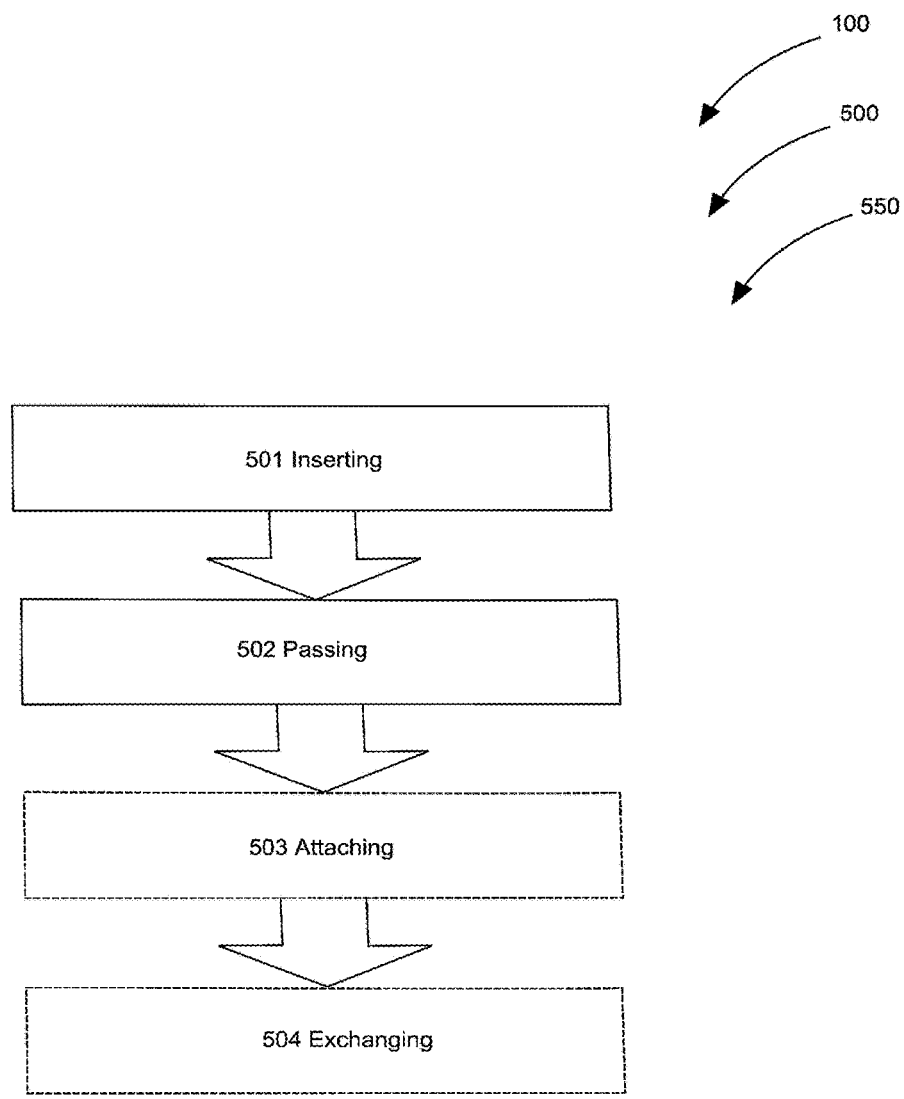
FIG. 5 is a flowchart illustrating a method of use for luminescent fishing float system according to an embodiment of the present invention of FIGS. 1-4.

Referring now to FIG. 5, a flowchart 550 illustrating a method of use 500 for luminescent fishing float system 100 according to an embodiment of the present invention of FIGS. 1-4.

A method of using (method of use 500) luminescent fishing float system 100 comprises the steps of: step one 501 inserting cylindrical rod 120 through float body 130, both of user-preference, step two 502 passing fishing line 140 through cylindrical rod 120, step three 503 attaching baited hook 150 (to fishing line 140), and step three 503 activating an illumination to aid in attracting fish during low-light conditions. Method of use 500 may further comprise the step four 504 of exchanging another cylindrical rod 120 through float body 130 for use to increase efficiency and effectiveness in fishing episodes.

It should be noted that steps 503 and 504 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A luminescent fishing float system comprising:
   a luminescent fishing float assembly having;

an elongated cylindrical rod with an inner through-hole running a length of the cylindrical rod, said inner through-hole defined by a first aperture and a second aperture;

a float body having;
  a top-aperture; and
  a bottom-aperture;

an elongated light stick having a length larger than said length of said elongated cylindrical rod, and wherein said elongated light stick is adapted to glow in the dark and emit light therefrom; and a plurality of spaced, elongated flutes located along a length of an external surface of said cylindrical rod that have a thickness extending outwardly from said external surface of said cylindrical rod, and wherein said flutes are adapted to contact a body of water when in use such that said cylindrical rod is deterred from spinning relative to said body of water;

wherein portions of said elongated cylindrical rod passes through said float body top-aperture and said bottom-aperture, such that said float body is positioned and held upon an outer surface of a center portion of said cylindrical rod;

wherein said elongated light stick is placed within said elongated cylindrical rod such that said elongated cylindrical rod is positioned and held upon an outer surface of a center portion of said elongated light stick, such that an upper portion of said light stick extends upwards from said elongated cylindrical rod and is adapted to emit light above the waterline of said body of water when in use, and a lower portion of said light stick extends downwards from said elongated cylindrical rod and is adapted to emit light below the waterline of a body of water when in use;

wherein said luminescent fishing float system comprises said luminescent fishing float assembly;

wherein said luminescent fishing float assembly comprises in functional combination said cylindrical rod passing through said top-aperture and said bottom-aperture of said float body respectively;

wherein said float body permits said luminescent fishing float assembly to maintain a floating position relative to a water surface;

wherein said cylindrical rod allows a fishing line to pass through said inner through-hole running respectively through said first aperture and said second aperture, said fishing line attached to a baited hook;

wherein said luminescent fishing float assembly is able to provide luminescence during low-light conditions to increase efficiency and effectiveness in fishing episodes; and wherein said luminescent fishing float assembly is structured and arranged to suspend bait at a predetermined depth, to carry a baited hook to otherwise inaccessible areas of water by allowing said float body to drift in prevailing current, said float body serving as an illuminated bite indicator for a user-fisherman.

2. The luminescent fishing float system of claim 1 wherein said luminescent fishing float assembly in combination with said baited hook serves to attract fish during said low-light conditions via chemical activation.

3. The luminescent fishing float system of claim 1 wherein said float body comprises bottom-weighting.

4. The luminescent fishing float system of claim 3 wherein said float body comprises cork.

5. The luminescent fishing float system of claim 3 wherein said float body comprises wood.

6. The luminescent fishing float system of claim 3 wherein said float body comprises glass.

7. The luminescent fishing float system of claim 3 wherein said float body comprises plastic.

8. The luminescent fishing float system of claim 1 wherein said luminescent fishing float assembly is waterproof.

9. The luminescent fishing float system of claim 1 wherein said illuminated bite indicator is non-battery powered.

10. The luminescent fishing float system of claim 1 wherein said cylindrical rod is semi-transparent.

11. The luminescent fishing float system of claim 1 wherein said cylindrical rod is adjustable to secure to said fishing-line.

12. The luminescent fishing float system of claim 1 wherein said cylindrical rod is friction-fit in said top-aperture and said bottom-aperture of said float body.

13. The luminescent fishing float system of claim 1 wherein said luminescent fishing float assembly comprises a multi-piece construction.

14. The luminescent fishing float system of claim 1 wherein said cylindrical rod is flexible.

\* \* \* \* \*